H. T. KRIGEL.
METHOD OF FIXING COLOR MARKINGS ON THERMOMETER STEMS.
APPLICATION FILED JULY 19, 1918.
1,405,231.
Patented Jan. 31, 1922.
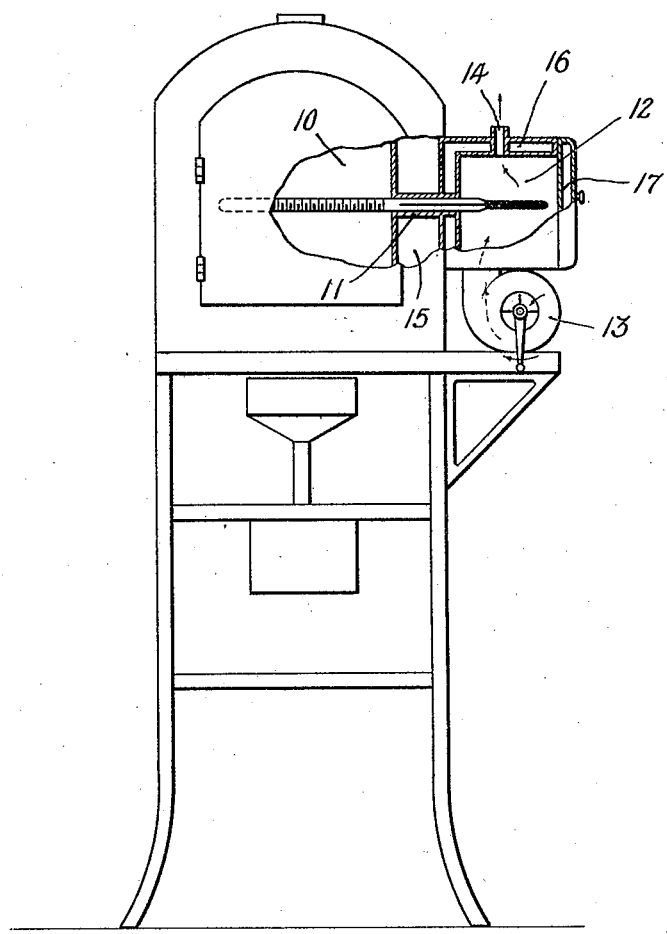
WITNESSES
INVENTOR
H. T. Krigel
BY
ATTORNEYS

UNITED STATES PATENT OFFICE.

HERSHON T. KRIGEL, OF NEW YORK, N. Y.

METHOD OF FIXING COLOR MARKINGS ON THERMOMETER STEMS.

1,405,231. Specification of Letters Patent. Patented Jan. 31, 1922.

Application filed July 19, 1918. Serial No. 245,791.

*To all whom it may concern:*

Be it known that I, HERSHON T. KRIGEL, a citizen of Russia, and a resident of the city of New York, borough of Manhattan, in the county and State of New York, have invented a new and Improved Method of Fixing Color Markings on Thermometer Stems, of which the following is a full, clear, and exact description.

This invention relates to the manufacture of high class clinical thermometers or other analogous instruments, and has particular reference to the method or manner of fixing the markings on the stems of such instruments after the instruments are filled with mercury. I wish it to be understood, however, that while I indicate and refer specifically herein to the manufacture of thermometers, certain features of my invention are or may be applicable in other arts, and therefore I do not intend to be unnecessarily limited in the interpretation of my claims.

Among the objects of the invention, therefore, is to improve the means or methods for manufacturing graduated instruments with respect to the reliability and permanency of the markings thereon, especially the graduation marks.

More specifically stated, my invention includes means or facilities for fixing the markings upon the stem of a thermometer by firing, the markings being first applied through the medium of a vitrifiable color or paint which will fuse when subjected to the intense heat of a firing kiln such as used by china painters or the like, but at the same time I provide means to keep the mercury bulb sufficiently cool to prevent such expansion thereof as will cause fracture of the instrument when subjected to the intense heat.

While I do not desire to be restricted to any particular mechanism for accomplishing the foregoing objects, yet I show in the accompanying drawing a suggestion of mechanism through which the invention may be practiced, said figure comprising a front elevation of the apparatus, partly in section, illustrating my process.

Since in the manufacture of thermometers, especially high class clinical instruments, it is necessary to graduate the stem after the instrument is formed and filled with mercury, the graduation marks must be applied in such a manner, in the usual practice, as to not disturb or materially effect the action or status of the mercury. Consequently the usual practice is for the graduation marks to be etched on the stem, a process that is relatively troublesome and expensive or else marks are applied by means of paint and so subject to fault of erasure, rendering the instrument difficult to use or read.

In the practice of my invention, therefore, as distinguished from the prior and more or less unsatisfactory methods I make and fill the thermometer in any usual or approved manner and graduate the stem by any method well understood in the art, but in the formation of the markings on the stem I suggest a vitrifiable color of the nature employed in the ceramic art or in painting on glass or china, in which art the color is fixed by introducing the article on which the color is applied into an oven and subjecting the vitrifiable color to fusion under high heat. In this process of fixing colors, as is well known, the color becomes exceedingly hard and is encrusted over by a film or the like which insures its permanency. The heat incident to the practice of a furnace of this character naturally would be excessive and fatal to the thermometer if the bulb were subjected to it for the reason that the expansion of the metal would immediately fracture the glass. I, therefore, provide a furnace 10 adapted to be heated to a high temperature by any suitable means. Into this furnace I plunge the stem of a thermometer to which the vitrifiable color has been applied as above indicated, as through an opening 11 in one wall of the furnace so as to bring the stem within the furnace while the bulb portion remains on the outside of the furnace. As indicated an auxiliary chamber 12 is provided for the bulb and in or through which any suitable cooling medium may be placed or passed, such as cool air, water, oil, ice, or any other cooling or refrigerating means or medium. As indicated an air fan or blower 13 is used, the spout of which communicates with the chamber 12, a relief vent 14 being provided at any desired place to complete the circulating system for the cooling medium. While I indicate the furnace as provided with a jacket space 15 and the auxiliary chamber as having a similar jacket space 16, I wish it to be understood that I do not intend to be limited unnecessarily to any special form or embodiment of mechanism or means to carry out the spirit of this invention. The auxiliary chamber is provided with a door 17 which when open gives access to the opening 11 through which the stem of the thermometer is passed into and out of the furnace. By the means indicated or suggested the action of the furnace in fusing the vitrifiable color applied to the stem is not interfered with by the cooling medium applied to the bulb of the thermometer on the outside of the furnace, and by reason of the cooling of the bulb it follows that the intense heat required for the fixing of the color on the stem does not affect the status or condition of the contents of the bulb. This process can be carried out with facility, precision, and utmost reliability, the instruments being better and more durable than have been heretofore produced by any other means or method.

I claim:

1. The herein described method of fixing color markings on a thermometer stem, the method comprising the application or use of vitrifiable color for the markings, the fusing of the color while subjected to intense heat, and the subjection of the bulb of the thermometer to a cooling medium coincidentally with the fusion of the color markings.

2. The herein described method of fixing the color markings on a clinical thermometer previously filled with mercury and sealed, the method comprising the application to the stem of vitrifiable color in a plastic state, the subjection of the marked stem to intense heat to fuse the color, the holding of the thermometer in fixed position with the bulb remote from the heat, and the subjection to the bulb remote from the heat of a circulating cooling medium coincidentally with the action of the heat on the stem.

3. The herein described method of fixing color markings on a part of a device, another part of which device is of such a nature that its subjection to high temperature would be fatal to the device, the method comprising the application of color to the marked portion of the device by means of a vitrifiable plastic color, the subjection of the marked portion of the device to intense heat, and the protection of the first mentioned portion of the device from the heat coincidentally with the fusion of the color applied to the marked portion.

4. The process of marking thermometer tubes which consists in applying a pigment to the tube, heating the tube to a predetermined degree to bake the pigment thereon and concurrently cooling the bulb of the thermometer.

5. The process of marking thermometer tubes which consists in applying a pigment to the tube, heating the tube to a predetermined degree to bake the pigment thereon and concurrently circulating a cooling medium about the bulb of the thermometer.

6. The herein described method of fixing color markings on thermometer stems, the method comprising the application or use of pigments for the markings on the tube, the baking of the pigments thereon while subjected to a predetermined degree of heat, and the subjection of the bulb of the thermometer to a cooling medium coincidentally with the baking of the color markings.

7. The herein described method of fixing color markings on a clinical thermometer, the method comprising the application to the stem of pigments in a plastic state, heating the tube to a predetermined degree to bake the pigments thereon, the holding of the thermometer in fixed position with the bulb remote from the heat, and the subjection to the bulb remote from the heat of a circulating cooling medium coincidentally with the action of the heat to the stem.

8. The herein described method of fixing color markings to a part of a device, another part of which device is of such a nature that its subjection to high temperature would be fatal to the device, the method comprising the application of color to the marked portion by means of pigments, the heating of the marked portion to a predetermined degree to bake the pigments thereon, and the protection of the first-mentioned portion of the device from the heat coincidentally with the baking of the color applied to the second or marked portion.

HERSHON T. KRIGEL.